United States Patent
Furuya

(10) Patent No.: US 9,936,105 B2
(45) Date of Patent: Apr. 3, 2018

(54) IMAGE PROCESSING APPARATUS AND IMAGE PROCESSING METHOD

(71) Applicant: CANON KABUSHIKI KAISHA, Tokyo (JP)

(72) Inventor: Kohei Furuya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/973,847

(22) Filed: Dec. 18, 2015

(65) Prior Publication Data

US 2016/0191826 A1   Jun. 30, 2016

(30) Foreign Application Priority Data

Dec. 26, 2014   (JP) ................................. 2014-265779

(51) Int. Cl.

| | |
|---|---|
| *H04N 5/217* | (2011.01) |
| *H04N 5/357* | (2011.01) |
| *H04N 5/359* | (2011.01) |
| *H04N 5/369* | (2011.01) |
| *H04N 9/04* | (2006.01) |
| *H04N 5/232* | (2006.01) |

(52) U.S. Cl.
CPC ............. *H04N 5/217* (2013.01); *H04N 5/359* (2013.01); *H04N 5/3572* (2013.01); *H04N 5/3696* (2013.01); *H04N 9/045* (2013.01); *H04N 5/23212* (2013.01)

(58) Field of Classification Search
None
See application file for complete search history.

(56) References Cited

U.S. PATENT DOCUMENTS

| | | | |
|---|---|---|---|
| 2010/0214452 A1* | 8/2010 | Kawarada | ............. G02B 7/346 348/255 |
| 2013/0002911 A1 | 1/2013 | Miyashita et al. | |
| 2014/0240550 A1 | 8/2014 | Taniguchi et al. | |

(Continued)

FOREIGN PATENT DOCUMENTS

| | | |
|---|---|---|
| CN | 102857692 A | 1/2013 |
| CN | 103828344 A | 5/2014 |

(Continued)

OTHER PUBLICATIONS

The above patent documents were cited in a May 19, 2017 Chinese Office Action, which is enclosed with an English Translation, that issued in Chinese Patent Application No. 201510993992.7.

*Primary Examiner* — Timothy J Henn
(74) *Attorney, Agent, or Firm* — Cowan, Liebowitz & Latman, P.C.

(57) ABSTRACT

An image processing apparatus and an image processing method capable of discriminating with good precision a cause of image degradation that occurs in a value of a pixel adjacent to a focusing pixel, and of appropriately performing correction. When correcting a value of an imaging pixel adjacent to a focusing pixel, it is determined whether the value of the correction target pixel is influenced by flare based on a value of an imaging pixel adjacent to the focusing pixel that exists in a vicinity of a correction target pixel, and values of a plurality of imaging pixels that exist in a vicinity and are not adjacent to the focusing pixel. An appropriate method for correcting the influence of flare is used if it is determined that the value of the correction target pixel is influenced by flare.

9 Claims, 7 Drawing Sheets

(56) References Cited

U.S. PATENT DOCUMENTS

2017/0148828 A1* 5/2017 Ito .................... H01L 27/1463
2017/0150063 A1* 5/2017 Sano .................... H04N 5/243

FOREIGN PATENT DOCUMENTS

| JP | 2000-156823 A | 6/2000 |
| JP | 2009-124573 A | 6/2009 |
| JP | 2013-247597 A | 12/2013 |
| JP | 2014-194440 A | 10/2014 |
| WO | 2013/168505 A1 | 11/2013 |

* cited by examiner

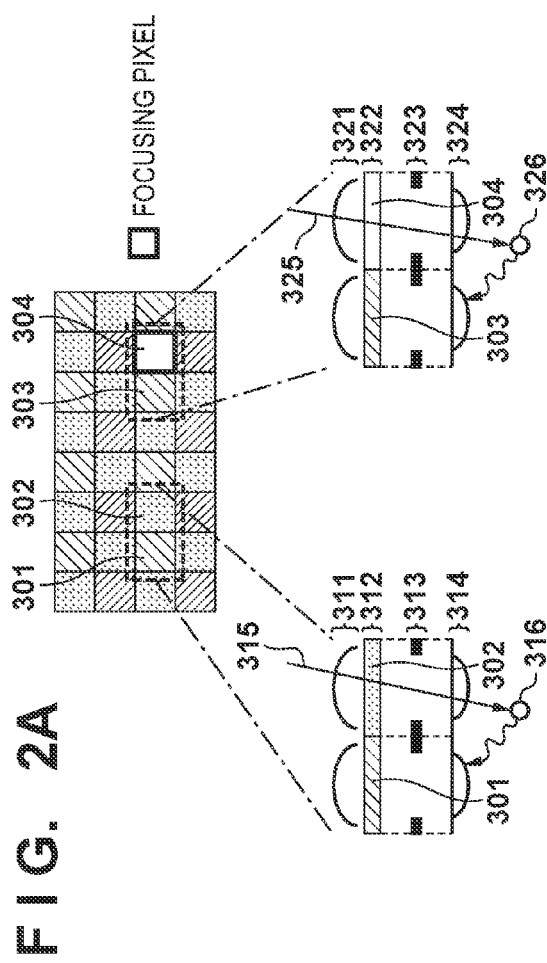
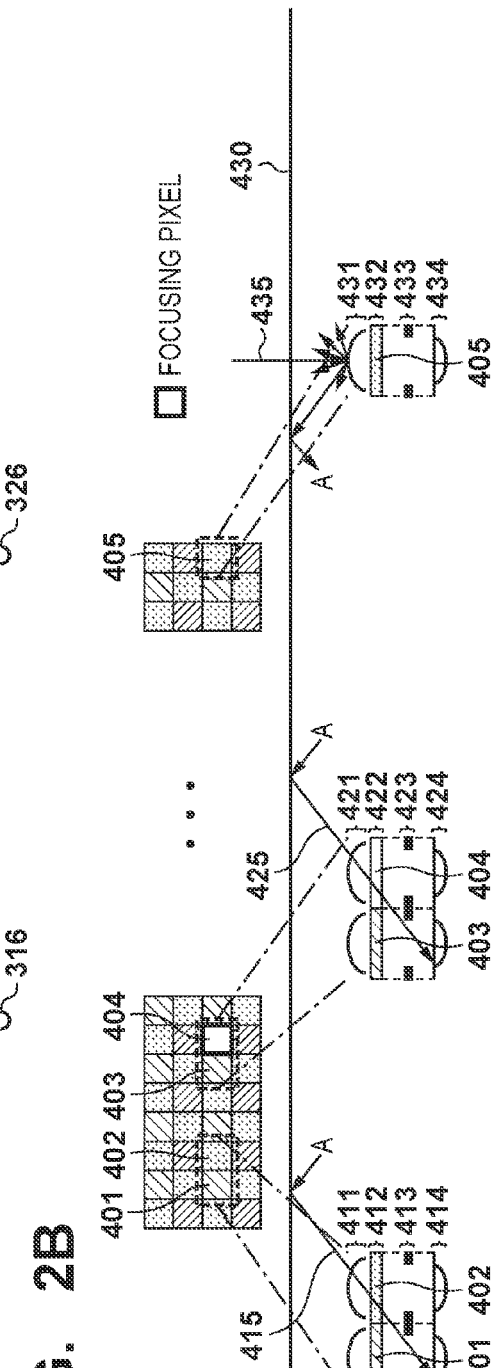

FIG. 5A
FIG. 5B
FIG. 5C
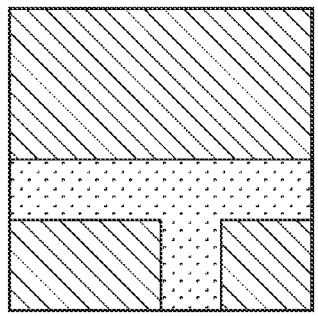
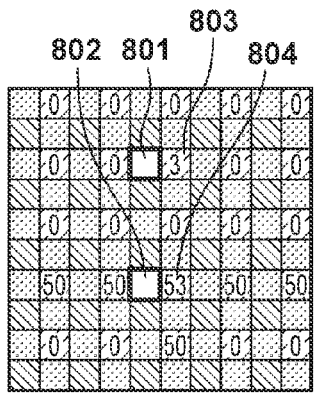
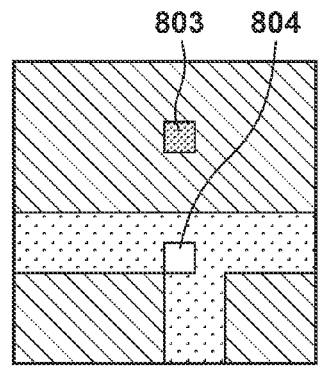
☐ FOCUSING PIXEL
FIG. 5D
CONTROL WITH APPROPRIATE THRESHOLD VALUE
FIG. 5E
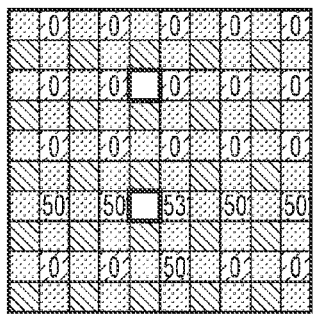
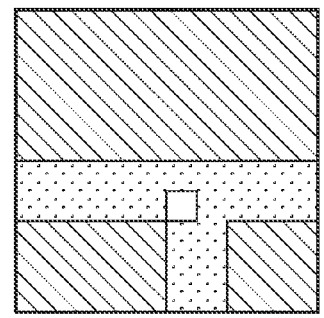
☐ FOCUSING PIXEL
FIG. 5F
WHEN THRESHOLD VALUE IS TOO BIG
FIG. 5G
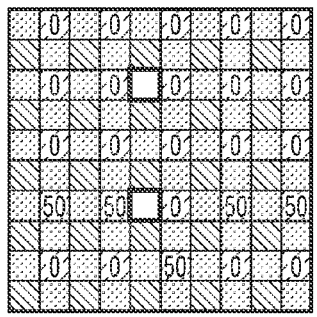
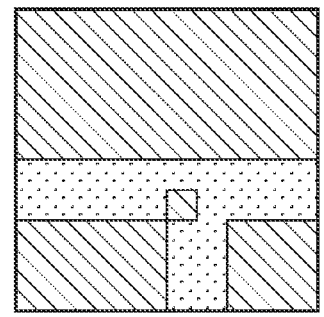
☐ FOCUSING PIXEL

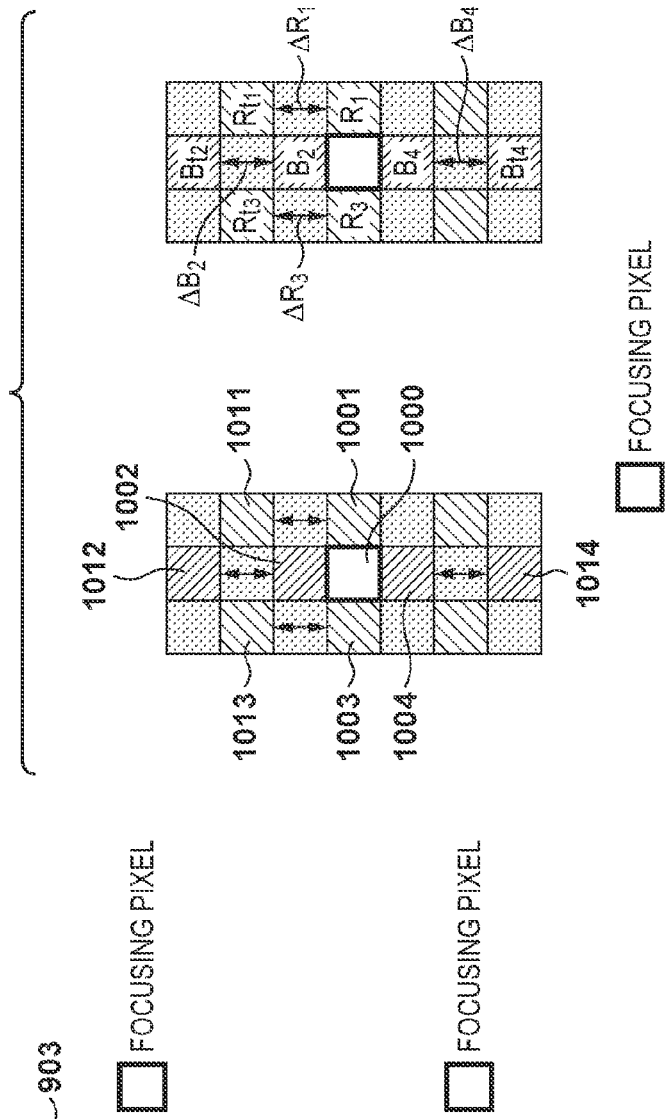

IMAGE PROCESSING APPARATUS AND IMAGE PROCESSING METHOD

BACKGROUND OF THE INVENTION

Field of the Invention

The present invention relates to an image processing apparatus and an image processing method, and particularly relates to a pixel value correction technique.

Description of the Related Art

Conventionally, an image sensor, in which a portion of pixels are configured as focusing pixels, that uses output of the focusing pixels to enable focus detection according to a phase-difference detection method is known (Japanese Patent Laid-Open No. 2000-156823).

However, because a focusing pixel has a structure different to that of a normal pixel (an imaging pixel), there are cases in which there is an influence on the pixel values surrounding the focusing pixel, and image degradation is caused to occur. Japanese Patent Laid-Open No. 2009-124573 proposes a method that uses a crosstalk rate according to an aperture value to correct values of imaging pixels surrounding a focusing pixel based on a value of a focusing pixel in the vicinity of the imaging pixels. In addition, Japanese Patent Laid-Open No. 2013-247597 proposes a method that determines whether a flare due to reflected light from a wiring region has occurred in accordance with existence/absence of a magenta region greater than or equal to a predetermined numbers of pixels, and applies smoothing processing when an imaging pixel surrounding a focusing pixel belongs to the magenta region. It also determines that the influence of a flare is more strongly received, and increases the smoothness, the more a pixel belongs to a region for which the magenta color is deep.

Because spectral characteristics of light incident on a focusing pixel differs to that for an imaging pixel, there are two causes for an influence on a value of an imaging pixel adjacent to a focusing pixel—crosstalk and flare (ghost)—and it is possible for both influences to be mixed inside one image. Because it is more likely for flare to occur if a bright light source is present, it can have a larger influence on the pixel value than crosstalk.

If processing that corrects the influence of flare is applied to pixels that are not influenced by the flare, a false correction becomes the cause of an image degradation, and therefore it is necessary to detect with good precision pixels that are influenced by flare. However, in the technique recited in Japanese Patent Laid-Open No. 2013-247597, because a magenta color region is detected as a collection of pixels that are influenced by a flare, there is the possibility that a region of a magenta-colored object will be incorrectly detected as a region that became the magenta color due to flare.

SUMMARY OF THE INVENTION

The present invention was conceived in view of such problems in conventional techniques. The present invention provides an image processing apparatus, an image capture apparatus, and an image processing method capable of discriminating with good precision a cause of image degradation that occurs in a value of a pixel adjacent to a focusing pixel, and of appropriately performing correction.

According to an aspect of the present invention, there is provided an image processing apparatus comprising: an obtaining unit configured to obtain a value of a first imaging pixel adjacent in a first direction to a first focusing pixel, and a value of a second imaging pixel adjacent in the first direction to a second focusing pixel present in a vicinity of the first imaging pixel; and a correcting unit configured to correct the value of the first imaging pixel based on a result of comparing (a) the values of the first imaging pixel and the second imaging pixel with (b) values based on values of a plurality of third imaging pixels that exist in vicinities of the first imaging pixel and the second imaging pixel and are not adjacent to a focusing pixel.

According to another aspect of the present invention, there is provided an image processing apparatus comprising: an obtaining unit configured to obtain values of a plurality of first imaging pixels adjacent to a first focusing pixel, and values of a plurality of second imaging pixels that are present in vicinities of the plurality of first imaging pixels and are not adjacent to the first focusing pixel; and a correcting unit configured to obtain differences of each of the values of the plurality of first imaging pixels with values based on the values of the plurality of second imaging pixels, and, if a maximum value of the differences is greater than each of the other differences by greater than or equal to a threshold, correct a value of a pixel, from the plurality of first imaging pixels, for which the difference is the maximum value.

According to a further aspect of the present invention, there is provided an image processing apparatus comprising: an obtaining unit configured to obtain values of a plurality of first imaging pixels that are adjacent to a first focusing pixel, values of a plurality of second imaging pixels that are present in vicinities of the plurality of first imaging pixels and are not adjacent to the first focusing pixel, values of a plurality of third imaging pixels adjacent to a second focusing pixel, and values of a plurality of fourth imaging pixels that are present in vicinities of the plurality of third imaging pixels and are not adjacent to the second focusing pixel; and a correcting unit configured to correct, if a direction from the first focusing pixel to a pixel, from the plurality of first imaging pixels, for which a first difference with a value based on the values of the plurality of second imaging pixels is a maximum value, is the same as a direction from the second focusing pixel to a pixel, from the plurality of third imaging pixels, for which a second difference with a value based on the values of the plurality of fourth imaging pixels is a maximum value, the value of a pixel, from the plurality of first imaging pixels, for which the first difference is a maximum value.

According to another aspect of the present invention, there is provided an image processing method, comprising: obtaining a value of a first imaging pixel adjacent to a first focusing pixel in a first direction; obtaining a value of a second imaging pixel adjacent in the first direction to a second focusing pixel present in a vicinity of the first imaging pixel; comparing (a) values of the first imaging pixel and the second imaging pixel with (b) values based on values of a plurality of third imaging pixels that exist in vicinities of the first imaging pixel and the second imaging pixel and are not adjacent to a focusing pixel; and correcting the value of the first imaging pixel based on a result of the comparing.

According to a further aspect of the present invention, there is provided an image processing method, comprising: obtaining values of a plurality of first imaging pixels adjacent to a first focusing pixel; obtaining values of a plurality of second imaging pixels that are present in vicinities of the plurality of first imaging pixels and are not adjacent to the first focusing pixel; obtaining differences between each value of the plurality of first imaging pixels and values based on the values of the plurality of second imaging pixels; and correcting, if a maximum value of the differences is greater than each other difference by greater than or equal to a threshold, the value of a pixel from the plurality of first imaging pixels for which the difference is the maximum value.

According to another aspect of the present invention, there is provided an image processing method, comprising: obtaining values of a plurality of first imaging pixels adjacent to a first focusing pixel; obtaining values of a plurality of second imaging pixels that are present in vicinities of the plurality of first imaging pixels and are not adjacent to the first focusing pixel; obtaining values of a plurality of third imaging pixels adjacent to a second focusing pixel; obtaining values of a plurality of fourth imaging pixels that are present in vicinities of the plurality of third imaging pixels and are not adjacent to the second focusing pixel; and correcting, if a direction from the first focusing pixel to a pixel, from the plurality of first imaging pixels, for which a first difference with a value based on the values of the plurality of second imaging pixels is a maximum value, is the same as a direction from the second focusing pixel to a pixel, from the plurality of third imaging pixels, for which a second difference with a value based on the values of the plurality of fourth imaging pixels is a maximum value, the value of a pixel, from the plurality of first imaging pixels, for which the first difference is a maximum value.

Further features of the present invention will become apparent from the following description of exemplary embodiments with reference to the attached drawings.

BRIEF DESCRIPTION OF THE DRAWINGS

FIG. 2A and FIG. 2B are views for illustrating an example of image degradation, due to crosstalk and flare, that occurs in the pixel adjacent to a focusing pixel.

FIG. 5A to FIG. 5G are pattern diagrams for explaining an example of the pixel correction processing and an effect of a threshold, according to embodiments.

FIG. 6A to FIG. 6C are pattern diagrams for explaining an example of flare determination processing in a first embodiment.

FIG. 7 is a pattern diagram for explaining an example of flare determination processing in a second embodiment.

DESCRIPTION OF THE EMBODIMENTS

Figure 1A:
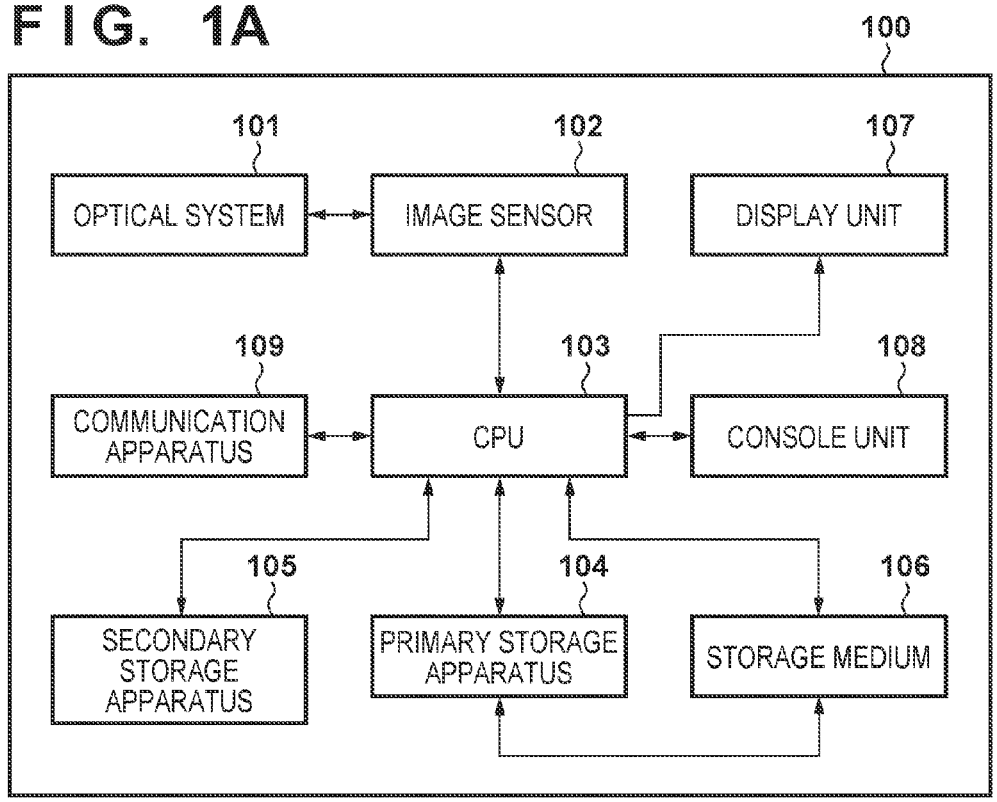
FIG. 1A and FIG. 1B are block diagrams of an image capture apparatus and an information processing apparatus according to embodiments of the present invention.

Exemplary embodiments of the present invention will now be described in detail in accordance with the accompanying drawings. Note that, in the following embodiments, examples of applying the present invention to an image capture apparatus are given, but it is not necessary for the image processing apparatus according to the present invention to have a configuration specific to an image capture apparatus, such as a function related to capturing or recording of a captured image. The present invention can be embodied in any electronic device that can obtain image data acquired by capturing and information relating to a defective pixel of an image sensor used in that capturing. The image capture apparatus is not limited to an apparatus whose main function is capturing, such as a digital camera; it has the meaning of an electronic device that has imaging capabilities.

Note that each of functional blocks such as a "unit" and a "section" in the drawings can be realized by dedicated hardware (i.e., discrete circuits, an ASIC, programmable logic devices, etc.), software (i.e., a combination of software and a processor such as a CPU and a MPU that executes the software), or a combination thereof. Also note that a plurality of the functional blocks can be implemented as a single hardware entity. Therefore, the following descriptions merely indicate one of many possible implementations of the function blocks.

First Embodiment

FIG. 1A is a block diagram for illustrating an example of a functional configuration of an image capture apparatus 100, which is an example of an image processing apparatus according to embodiments of the present invention.

The image capture apparatus 100 is an apparatus, such as a digital camera or a digital video camera, that captures an object and obtains data that represents an image of the object (image data). An optical system 101 has a lens, a shutter, and an aperture, and is caused to form an optical image of an object on an image sensor 102 in accordance with control of a CPU 103. The image sensor 102, which is a CCD or a CMOS image sensor, or the like, photoelectrically converts the formed optical image of the object by each pixel, and performs conversion to an analog image signal. The CPU 103 converts the analog image signal into a digital image signal (image data), and applies so-called development processing, such as white balance control or color interpolation processing, or encoding processing, or the like. By executing programs to control each functional block, the CPU 103 realizes various functions of the image capture apparatus 100.

A primary storage apparatus 104 is, for example, a volatile storage apparatus such as a RAM, and is used as a temporary data storage region, such as a work area of the CPU 103. A secondary storage apparatus 105 is, for example, a nonvolatile storage apparatus such as an EEPROM, and stores programs for controlling the image capture apparatus 100 (firmware), programs that the CPU 103 executes, various setting information, or the like.

A storage medium 106, which is for example a semiconductor memory card, stores image data acquired by capturing as a data file of a predetermined format. The storage medium 106 can be removed from the image capture apparatus 100, and can also be used by another apparatus that has a function of accessing the storage medium 106, e.g. a personal computer. In other words, it is sufficient if the image capture apparatus 100 has a function of accessing the storage medium 106, and can perform reading/writing of data with respect to the storage medium 106.

A display unit 107 is used to display a viewfinder image when capturing, to display an image that is captured or read from the storage medium 106, to display a user interface for interactive manipulation, or the like. A console unit 108 has, for example, an input device such as a button, a switch, a lever, or a touch panel, and allows a user to perform various instructions or settings with respect to the image capture apparatus 100. Note that a configuration that realizes an input method that does not require physical manipulation, such as audio input or line-of-sight input, is encompassed in the console unit 108.

A communication apparatus 109 allows the image capture apparatus 100 to transmit/receive a control command or data with an external apparatus. There is no particular restriction of a protocol used in communication with an external device, but, for example, it may be PTP (Picture Transfer Protocol). Note that the communication apparatus 109 may perform communication with an external device by a wired connection, for example a USB (Universal Serial Bus) cable or the like, or may perform communication with an external device by a wireless connection such as that of a wireless LAN. In addition, the external apparatus may be directly connected to, may be connected to via a server, or via a network such as the Internet.

Next, explanation is given by using FIG. 2A and FIG. 2B, regarding an example of a cause of the occurrence of a degradation in image quality, which is due to a focusing pixel. FIG. 2A schematically illustrates image degradation due to crosstalk that occurs by an electric charge, which is generated by performing photoelectric conversion in a pixel, leaking into an adjacent pixel. An upper part of FIG. 2A extracts and illustrates a pixel array of a portion of an image sensor, and a color filter having a particular color pattern is arranged for imaging pixels included in the image sensor.

Specifically, color filters of the same color (for example, red (R)) are provided for imaging pixels 301 and 303, and a color filter of a different color (for example, green (G)) is provided for an imaging pixel 302. Imaging pixels above and below the imaging pixel 301 are provided with color filters of the same color (green (G)) as that of the imaging pixel 302. Imaging pixels above and below the imaging pixel 302 and a focusing pixel 304 are provided with color filters of a common color (for example, blue (B)) that is different to those of the imaging pixels 301, 302

In addition, a lower part of the figure. schematically illustrates a perpendicular cross-section of the adjacent imaging pixels 301, 302, and the imaging pixel 303 and the focusing pixel 304, which are adjacent. Microlenses 311 and 321, color filters 312 and 322, wiring layers 313 and 323, and photodiodes 314 and 324 are provided for respective pixels. Note that a configuration other than that illustrated by FIG. 2A and FIG. 2B may be arranged. For example, the wiring layers 313 and 323 only illustrate a pattern of a lowest layer, and other wiring layers are not shown graphically.

Firstly, explanation is given for image degradation due to crosstalk. When a portion of incident light 315 that is incident on the imaging pixel 302 is photoelectrically converted at an exterior of the photodiodes 314, a generated electron 316 may leak into an adjacent pixel and influence the value of the adjacent pixel (crosstalk). Crosstalk is independent of a type of the pixel and may occur between any adjacent pixels, but a problem may occur when the color of a color filter provided for a focusing pixel is different from an original color pattern. In the example of FIG. 2A, while conventionally a color filter that is the same color as that of the imaging pixel 302 is provided in the position of the focusing pixel 304, but here a colorless (transparent) filter is provided. Thus, spectral characteristics of light incident on the focusing pixel 304 differs to spectral characteristics of incident light that passes through a color filter of the same color as that of the imaging pixel 302. Thus, the way in which an electron 326, which is photoelectrically converted at an exterior of the photodiodes 324, leaks into the imaging pixel 303 is different to the way in which leakage from the imaging pixel 302 to the imaging pixel 301 occurs. As a result, an influence of crosstalk from a focusing pixel on a value of an adjacent pixel differs from an influence of crosstalk from an imaging pixel having an adjacent pixel arrangement similar to that of the focusing pixel on the value of an adjacent pixel, and it is recognized as an image degradation.

Next, explanation is given for image degradation due to a flare. FIG. 2B schematically illustrates a pixel array and a perpendicular cross-section structure of a portion of pixels, for a portion of an image sensor similar to that of FIG. 2A. However, FIG. 2B illustrates a cover glass 430 of the image sensor. An imaging pixel 405 illustrates a pixel that has a color filter of the same color as an imaging pixel 402, and that is separated from a focusing pixel 404 in the same pixel row.

A portion of light 435 that is incident on the imaging pixel 405 propagates within the image sensor while being reflected by a microlens 431 of the imaging pixel 405 and the cover glass 430, and is incident (A in the drawing) on other pixels (here, imaging pixels 404 and 402). Because such reflected light increases the larger the quantity of incident light is, if a high luminance object such as the Sun is included, it is visually recognized as a phenomenon in which a portion of the image becomes bright (a flare) due to the reflected light. Because reflected light, which is a cause of a flare, can be incident on a pixel at a large angle as illustrated in FIG. 2B, the reflected light is incident on an adjacent pixel before reaching a photodiode of pixel on which it is incident, and the value of the adjacent pixel is influenced.

Similarly to the case of crosstalk, flare is a phenomenon that does not depend on a type of a pixel, and can occur between any adjacent pixels independent of the type of the pixels. However, if the color of a color filter of a focusing pixel is different to the color allocated by a color pattern of a color filter applied to imaging pixels, spectral characteristics of light incident on an adjacent pixel from a focus detection pixel is different to spectral characteristics of light incident on an adjacent pixel from an imaging pixel. Thus, the influence on an imaging pixel 401 in FIG. 2B due to the reflected light A is different from the influence on an imaging pixel 403 due to the reflected light A, and it is recognized as an image degradation.

As explained above, because a flare occurs if a high luminance object is present, there is a tendency that an influence due to light that leaks into an adjacent pixel is greater than an influence due to crosstalk.

The present embodiment suppresses such image degradation in a surrounding pixel of a focusing pixel that occurs due to a difference in a color of a color filter that a focusing pixel has, or in spectral characteristics of light incident on a focus detection pixel.

Figure 3B:
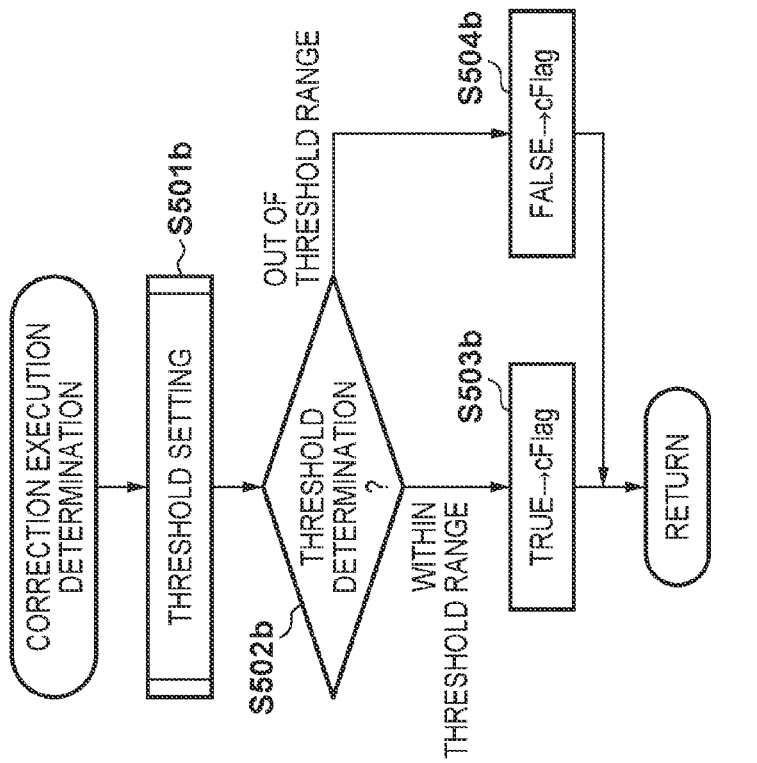
FIG. 3A to FIG. 3C are flowcharts illustrating an example of pixel correction processing according to embodiments.
Figure 3A:
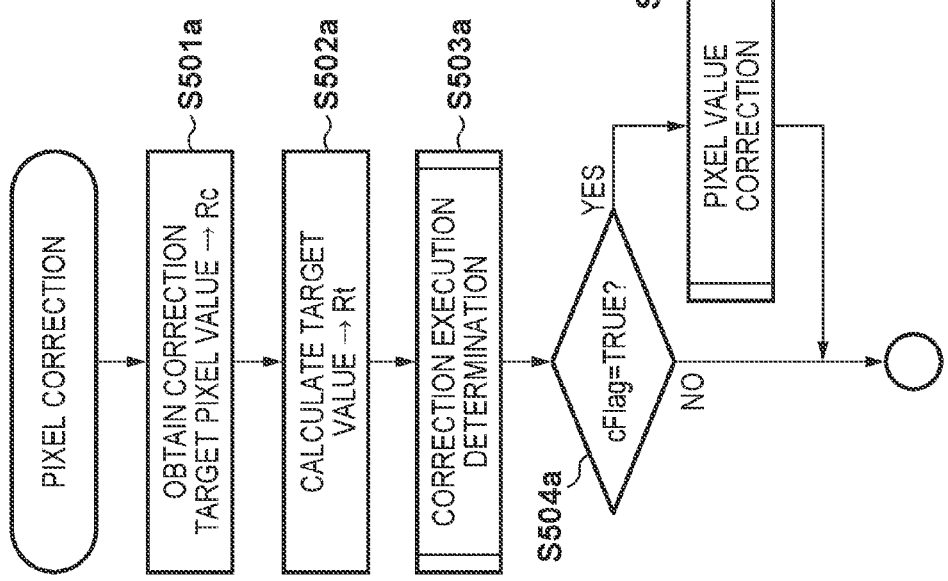
Figure 3C:
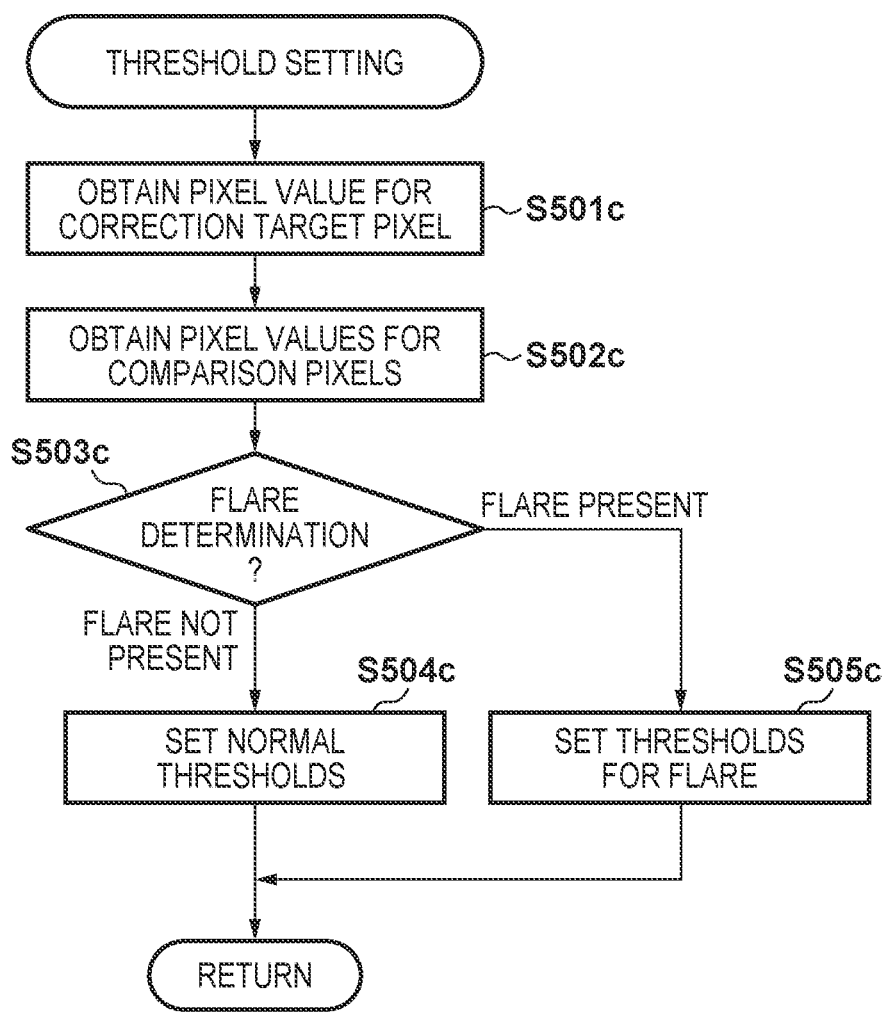
Figure 4A:
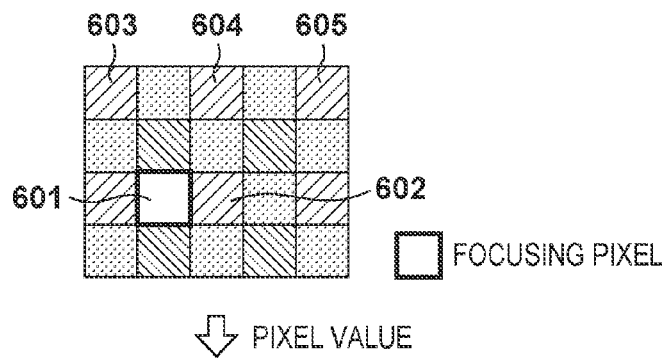
FIG. 4A to FIG. 4C are pattern diagrams for explaining the pixel correction processing according to embodiments.

FIG. 3A to FIG. 3C are flowcharts for explaining pixel correction processing, according to the present embodiment, that is for suppressing such image degradation, and is executed for each correction target pixel. Note that, in the following explanation, explanation is given for a case in which, if, as illustrated in FIG. 4A, a focusing pixel 601 is provided at a position of a green (G) pixel in an image sensor that is equipped with a primary color Bayer array color filter, a value of a right-adjacent red (R) pixel 602 is corrected.

Firstly, the CPU 103 obtains a value Rc of a correction target pixel (the pixel 602) in step S501a. Here, because the value of the pixel 602 is R33 as illustrated in FIG. 4A, the CPU 103 obtains the value R33 as the correction target pixel value Rc. In other words, $$Rc = R33 \qquad (1).$$

Next, in step S502a the CPU 103 calculates a target value Rt. The target value Rt is a prediction value for a case in which the pixel 602 is not influenced due to the focusing pixel 601. The prediction value can be calculated based on a value of imaging pixels that are not adjacent to a focusing pixel, for example same-color (R) pixels 603-605 in the vicinity. Here, for example as illustrated in FIG. 4A, if the values of the pixels 603-605 are R11, R13, and R15, the CPU 103 calculates the prediction value as an average value:

$$Rt=(R11+R13+R15)/3 \qquad (2).$$

Note that the method of calculating the prediction value and positions and number of pixels used in the calculation are not limited to this.

The CPU 103, for example, may execute pixel correction that immediately replaces the pixel value Rc of the correction target pixel 602 with the target value Rt, but it is possible that this will lead to a false correction. Thus, in the present embodiment, when the target value Rt is obtained, in step S503a, before performing pixel correction, the CPU 103 determines whether to execute the correction.

Figure 4B:
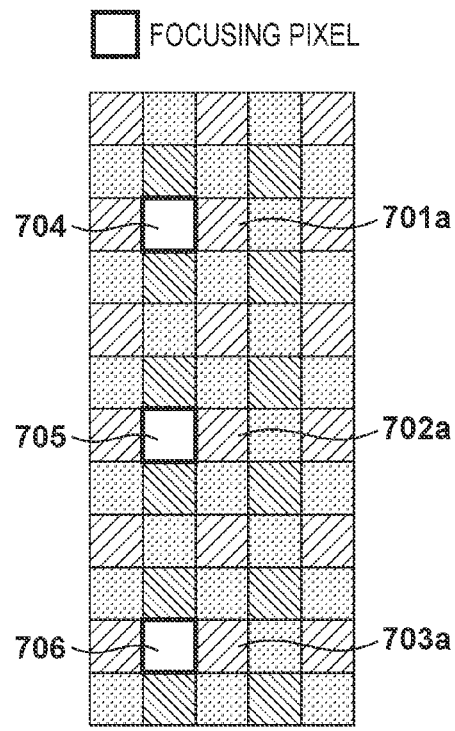
Figure 4C:
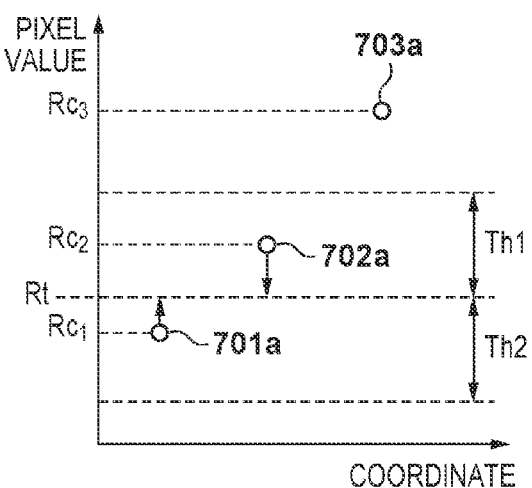

FIG. 4B and FIG. 4C are used to explain a concrete example of the determination performed in step S503a. FIG. 4B and FIG. 4C illustrate an example in which three pixels 701a, 702a, 703a, which are adjacent to focusing pixels 704, 705, 706 illustrated in FIG. 4B, are correction target pixels. Here, it is assumed that, as illustrated in FIG. 4C, in processing for each of the correction target pixels 701a, 702a, 703a, correction target pixel values Rc1, Rc2, and Rc3 are obtained in step S501a.

Note that, for simplicity, it is assumed that target value Rt calculated in step S502a for each of the correction target pixels 701a, 702a, 703a is the same for each. Firstly, in step S501b, the CPU 103 sets thresholds Th1 and Th2. Regarding these thresholds, for example with the target value Rt calculated in step S502a as a reference, it is possible to set them as values of Th1=(Rt+n % of Rt) and Th2=(Rt−n % of Rt), or values of Th1=(Rt+n) and Th2=(Rt−n). Note that if |Th1−Rt|=|Th2−Rt|, then one common threshold Th may be set.

In step S502b, the CPU 103 uses the thresholds Th1 and Th2 to determine whether to perform correction for each correction target pixel. Here, if the conditions:

(Rc−Rt)<(Th1−Rt) when the correction target pixel value Rc≥Rt, or (Rt−Rc)<(Rt−Th2) when the correction target pixel value Rc<Rt, (|Rc−Rt|<|Th−Rt| when Th is a common threshold)

are satisfied, the CPU 103 determines that correction is to be executed and the processing proceeds to step S503b; if the conditions are not satisfied, the CPU 103 determines that correction is not to be executed and the processing proceeds to step S504b.

Accordingly, in the example of FIG. 4C, it is determined that correction is to be executed for the correction target pixels 701a and 702a, and it is determined that correction is not to be executed for the correction target pixel 703a.

In step S503b the CPU 103 sets a flag cFlag that indicates existence/absence of correction execution to a value TRUE that represents execution of correction, and processing for determining correction execution terminates.

In step S504b the CPU 103 sets the flag cFlag that indicates existence/absence of correction execution to a value FALSE that represents non-execution of correction, and correction execution determination processing terminates.

Returning to FIG. 3A, in step S504a the CPU 103 determines the existence/absence of correction execution for each correction target pixel based on the value of the flag cFlag. If execution of correction is determined, the CPU 103 advances the processing to step S505a, and, for example, applies pixel value correction processing that replaces the pixel value Rc with the target value Rt, and the image-correction processing terminates. For correction target pixels for which correction is determined not to be executed in step S504a, the CPU 103 simply terminates the pixel correction processing.

FIG. 5A to FIG. 5G are used to explain an effect of performing the correction execution determination processing of step S503a. For example, assume that corresponding to an object such as illustrated in FIG. 5A, pixel values illustrated by FIG. 5B (only pixels of the same color as a correction target pixel are illustrated) are obtained. Here, for simplicity, it is assumed that only imaging pixels 803 and 804, which are right-side adjacent to focusing pixels 801 and 802, are influenced by crosstalk from the focusing pixels, and there is an increase of three from an original value.

If values of the correction target pixels 803 and 804 are not corrected, an output image is for example as in FIG. 5C. Because only the value of the correction target pixel 803 is different whereas surrounding same-colored pixels have the same value, the influence of crosstalk in the correction target pixel 803 is noticeable as image degradation. However, because the correction target pixel 804 is an edge portion of the object, the influence of crosstalk is comparatively harder to notice.

Here, a case in which the thresholds used in the threshold determination of step S502b are, for example, Th1=(Rt+5) and Th2=(Rt−5) is considered. In step S502a, if an average value of same-colored pixels in a vicinity of but not adjacent to a focusing pixel is calculated as the target value Rt, as in Equation (2) described previously, the target value Rt of the correction target pixel 803 becomes 0. Accordingly, the correction target pixel 803 satisfies the condition of (Rc−Rt)≤Th1, it is determined to be a pixel for which to execute correction, and in step S505a the pixel value is corrected to the target value of 0.

A similarly calculated target value Rt for the correction target pixel 804 is also 0, but because the correction target pixel value Rc is 53, the condition of (Rc−Rt)≤Th1 is not satisfied. Therefore, pixel correction is not executed for the correction target pixel 804, and the value Rc is kept as 53. Accordingly, after applying the pixel correction processing according to the present embodiment, pixel values become as illustrated in FIG. 5D, and for an output image necessary correction is performed while false correction is prevented, as in FIG. 5E, and image degradation due to crosstalk becomes harder to notice.

Because examples of FIG. 5A to FIG. 5G are of image degradation due to crosstalk, it was possible to perform appropriate correction by setting the threshold Th to Rt±5, but image degradation due to flare is greater than that due to crosstalk, and there are cases in which appropriate correction is not possible by this threshold. For example, if image degradation (a difference between the target value Rt and the pixel value Rc) due to flare that occurs in the correction target pixel 803 is of a size that exceeds the threshold, it is determined in correction execution determination processing to be a pixel for which correction is not performed.

So that correction is also performed if image degradation due to flare occurs, setting the thresholds Th1 and Th2 to be larger may be considered. However, if thresholds are set to be so large that the correction target pixel 804 of FIG. 5B satisfies the above described condition, correction that is not appropriate would be applied to the correction target pixel 804, and the pixel values and the image after the pixel correction processing would become as illustrated as in FIG. 5F and FIG. 5G.

In other words, to perform appropriate pixel correction in a case where both of image degradation due to crosstalk and image degradation due to flare could occur, it is necessary to change the thresholds depending on whether or not flare has occurred. Note that setting a threshold larger than 53 was assumed here in order to explain the possibility of false correction due to a threshold that was too large, but this does not limit the size of image degradation due to a flare. It is possible to determine in advance, via experimentation or a simulation, thresholds suitable to correction of image degradation due to crosstalk and thresholds suitable to correction of image degradation due to a flare, in accordance with a configuration of or characteristics of an image sensor, characteristics of an imaging lens, or the like.

Accordingly, in the present embodiment, when setting the thresholds in step S501b, the CPU 103 determines whether image degradation due to flare has occurred in the correction target pixel, and sets the thresholds in accordance with the result of the determination.

Here, explanation is given of an example of a method for determining existence/absence of image degradation due to flare. Image degradation due to flare has a strong tendency to occur in an adjacent pixel that sandwiches a focusing pixel and that is positioned in an opposite direction to a light source. For example, if there is a light source on the left side when facing the light-receiving surface of a focusing pixel, there is a strong tendency for image degradation due to flare to occur in a pixel that is adjacent to the right. In the present embodiment, characteristics are used to determine existence/absence of image degradation due to flare.

Specifically, for a plurality of surrounding focusing pixels, including a focusing pixel adjacent to a correction target pixel, the CPU 103 obtains values of imaging pixels for which a positional relationship (adjacent direction) with the focusing pixels is similar to that of the correction target pixel. Then the CPU 103, as the means for determination, determines that image degradation due to flare has occurred if pixel values of these are significantly larger (larger than in a case when they are due to crosstalk) than the values of same-colored pixels in the vicinity that are not adjacent to a focusing pixel.

FIG. 6A to FIG. 6C schematically illustrate an example of such flare determination processing. As illustrated in FIG. 6A, imaging pixels 901-903, which are adjacent on the right to focusing pixels 907-909, and surrounding same-colored pixels have a value of about the pixel value 50. For example, this corresponds to a state in which random noise is present in regions of the pixel value 50.

In this state, an example in which image degradation due to crosstalk has occurred in the imaging pixels 901-903 adjacent on the right of the focusing pixels 907-909 is illustrated in FIG. 6B, and an example in which image degradation due to a flare has occurred is illustrated in FIG. 6C. For simplicity, it is assumed that an influence of a flare or crosstalk occurs only on the right side of the focusing pixels 907-909, that image degradation (change in a pixel value) due to crosstalk is +3, and that image degradation (change in a pixel value) due to flare is +10.

For example, the flowchart of FIG. 3C is used to explain threshold setting processing for when setting the thresholds for the correction target pixel 902. In step S501c, the CPU 103 obtains the value of the correction target pixel 902 and pixel values of a plurality of correction target pixels adjacent to surrounding focusing pixels in the same direction as the correction target pixel 902. Here, because flare occurring on the right side of a focusing pixel is expected, values of the correction target pixels 901, 903 that are adjacent on the right side of focusing pixels present to the left and right in the same pixel row as the correction target pixel 902 are obtained. In fact, configuration may be taken so as to obtain a value from a correction target pixel present in a direction in which it is expected that flare will occur, based on a light source direction estimated from a position of a high luminance object in an image.

Values of the correction target pixels 901-903 are respectively assumed to be Rl, Rc, and Rr. Next in step S502c the CPU 103, as a means of determination, obtains, as pixel values for comparison, imaging pixels that are of the same color as the correction target pixel, are not adjacent to a focusing pixel, and are present in a specific direction in a vicinity of each of the correction target pixels 901-903. Here, for example setting the specific direction as an upwards direction, the CPU 103 obtains values of the imaging pixels 904-906 for comparison—these are respectively assumed to be Rtl, Rtc, and Rtr. Note that, from the same-colored pixels surrounding the correction target pixels, it is possible to set the imaging pixels for which values for comparison are obtained to be pixels that are not adjacent to a focusing pixel, and that are present in a direction different to the direction in which it is expected that flare will occur.

Next, in step S503c the CPU 103 as the means of determination respectively compares the values Rl, Rc and Rr of the correction target pixels 901-903 to the pixel values for comparison Rtl, Rtc and Rtr, and if $$Rl > Rtl + \alpha \text{ AND } Rc > Rtc + \alpha \text{ AND } Rr > Rtr + \alpha \qquad (3)$$

holds, it is determined that the value of the correction target pixel 902 is influenced by flare, the processing advances to S505c, and thresholds for flare are set. Thereby, in step S503a to step S505a, correction processing according to a first correction method that uses thresholds for flare is executed. As stated above, the thresholds for flare are assumed to be values for which a difference with a target value is larger than thresholds for crosstalk. Note that $\alpha$ in Equation (3) is a constant greater than or equal to 0, and is set to a value for dividing changes in pixel values due to crosstalk and changes in pixel values due to flare. Here, it is assumed that $\alpha=5$, but similarly to the thresholds, the value of $\alpha$ can be determined in advance via experimentation or simulation in accordance with a configuration or characteristics of the image sensor, characteristics of the imaging lens, or the like.

Detailed explanation is given using examples of FIG. 6B and FIG. 6C. In a state of FIG. 6B in which the correction target pixel 902 is influenced by crosstalk and is not influenced by flare, because the value Rc of the correction target pixel 902<comparison value (the value of the imaging pixel 905) Rtc, the conditions of Equation (3) are not satisfied regardless of the value of $\alpha$. In the threshold setting processing of FIG. 3C, the CPU 103 causes the processing to transition from step S503c to step S504c, and sets normal thresholds (i.e. for crosstalk). Thereby, in step S503a to step S505a, correction processing according to a second correction method that uses thresholds for crosstalk is executed.

In contrast, in the state of FIG. 6C in which the correction target pixel 902 is influenced by flare, the values Rl, Rc, and Rr of the correction target pixels 901-903 meet the conditions of Equation (3) in regards to the values Rtl, Rtc, and Rtr of the imaging pixels 904-906 for comparison. Therefore, in the threshold setting processing of FIG. 3C, the CPU 103 causes the processing to transition from step S503c to step S505c, and sets thresholds for flare for which the differences from the target values is larger than those of the normal thresholds.

In this way, if it is determined that the value of the correction target pixel is influenced by flare, by setting thresholds that are greater than in a case otherwise, it is possible to configure so as that, while suppressing false corrections, pixels for which correction is necessary are appropriately corrected.

Note that explanation was given here of an example of determining whether an influence of flare occurs by comparing a value of an imaging pixel adjacent on the right side of a focusing pixel (a correction target pixel) to a value of an imaging pixel of the same color that is present above the correction target pixel. However, for example, the determination may be performed by applying a similar method for each correction target pixel above, below, to the left and to the right of the focusing pixel. In addition, for the values Rtl, Rtc and Rtr of pixels for comparison, configuration may be taken to perform a comparison to an average value of a plurality of surrounding same-colored pixels, to determine if the pixels for comparison themselves are influenced by flare, and if it is determined that they are influenced by flare, perform the flare determination by comparing the average value with the value of the correction target pixel.

In addition, configuration may be taken such that, as in Equation (3), from a plurality of inequalities that configures a determination condition for flare, if an inequality is not satisfied, values between the normal thresholds and the thresholds for flare are set in accordance with the number of satisfied inequalities as the thresholds. Furthermore, configuration may be taken so that thresholds are caused to be changed, such as by selecting one threshold from a plurality of thresholds in accordance with an extent of a size of a value of a correction target pixel corresponding to a pixel value for comparison.

As explained above, by virtue of the present embodiment, it is possible to appropriately correct image degradation due to crosstalk or flare that occurs in a pixel adjacent to a focusing pixel, while suppressing false corrections. In addition, because whether image degradation due to flare has occurred is determined based on a plurality of the same-colored pixel values, it is possible to perform a determination that does not depend on an object color, and it is possible to determine a pixel that should be corrected with good precision.

Second Embodiment

In the first embodiment, explanation was given for an example of determining an occurrence of flare in accordance with whether each of a plurality of correction target pixels adjacent in a predetermined direction have values greater than values of imaging pixels (not adjacent to focusing pixels) of the same color that are adjacent in the same direction which is different to the predetermined direction.

In the present embodiment, details of processing of step S501c to step S503c in FIG. 3C, characterized in that the occurrence of flare is determined based on values of a plurality of correction target pixels adjacent to one focusing pixel, is different to that in the first embodiment. Accordingly, only the threshold setting processing in the present embodiment is explained below with reference to FIG. 7.

FIG. 7 is a view that extracts and illustrates a pixel array of a portion of the image sensor 102, and views on the left and right illustrate the same pixel group. Here, a correction target pixel of interest (a pixel whose value is obtained in step S501a) is set as a pixel 1001. In the present embodiment, in step S501c, the CPU 103 obtains values of the correction target pixel 1001 and pixels 1002, 1003 and 1004 that are adjacent to the same focusing pixel 1000 as is the correction target pixel 1001; values thereof are respectively assumed to be R1, B2, R3, and B4.

Next in step S502c, for each of the pixels 1001-1004 for which values were obtained in step S501c, the CPU 103 obtains pixel values of the pixels 1011, 1012, 1013, and 1014 that are of the same color and are adjacent in an upward or downward direction, as pixel values for comparison. These pixel values are respectively set as Rt1, Bt2, Rt3, and Bt4.

Next in step S503c, the CPU 103 performs determination of whether the correction target pixel 1001 is influenced by flare, but firstly as illustrated in FIG. 7 by arrows, differences between the values of each of the pixels 1001-1004 and the corresponding pixel values for comparison are calculated as follows.

$$\Delta R1 = R1 - Rt1$$

$$\Delta B2 = B2 - Bt2$$

$$\Delta R3 = R3 - Rt3$$

$$\Delta B4 = B4 - Bt4 \tag{4}$$

As also discussed in the first embodiment, if flare occurs, there is a strong tendency for the influence of flare to occur in a direction in which a high luminance object or a light source is present and in an opposite direction sandwiching the focusing pixel. Accordingly, in regards to each difference $\Delta R1$, $\Delta B2$, $\Delta R3$, and $\Delta B4$ calculated in Equation (4), for example if the following inequality holds, the CPU 103 can predict that there is a light source in a leftwards direction in the figures, and image degradation due to flare occurs on the right side of the focusing pixel.

$$\Delta R1 \gg \Delta B2 \text{ AND } \Delta R1 \gg \Delta R3 \text{ AND } \Delta R1 \gg \Delta B4 \tag{5}$$

Accordingly, for example a predicted threshold Th is designated as the influence of crosstalk in advance, and if the following Formula (6) holds, it is possible to configure such that the thresholds used in the pixel correction processing of the correction target pixel 1001 are set as thresholds for flare.

$$\Delta R1 - \text{MAX}(\Delta B2, \Delta R3, \Delta B4) > Th \tag{6}$$

If the correction target pixel is the pixel 1003, by evaluating $\Delta R3$ instead of $\Delta R1$, it is possible to predict that there is a light source in a rightwards direction in the figures, and that image degradation due to flare occurs on the left side of the focusing pixel.

By the same principle, if the correction target pixel is the pixel 1002 or the pixel 1004, by calculating and evaluating a difference for same-colored pixels adjacent in leftward/rightward directions, it is possible to predict occurrence of flare in upward direction or downward directions.

In this way, in the present embodiment, the existence/absence of an influence of flare is determined from values of a plurality of adjacent pixels associated with a focusing pixel, and values of imaging pixels that are respectively adjacent to the plurality of adjacent pixels in predetermined directions, that are of the same color, and that are not adjacent to the focus detection pixel. By virtue of the present embodiment, it is also possible perform appropriate correction processing in accordance with the existence/absence of flare.

Note that it is possible to combine the first and the second embodiment. For example, configuration may be taken to determine so as to perform flare correction if it is determined by the method of the second embodiment that, for a plurality of focusing pixels, adjacent pixels of the same direction influenced by flare. If this method is used, it is possible to further increase detection precision of the existence/absence of the influence of flare.

Figure 1B:
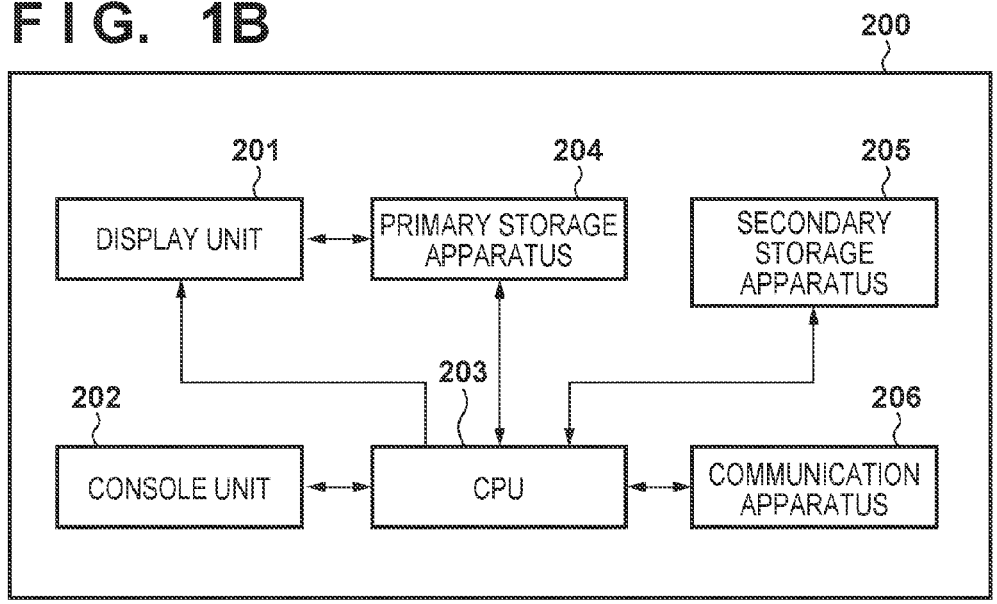

FIG. 1B is a block diagram for illustrating an example of a functional configuration of an information processing apparatus 200, which is another example of an image processing apparatus according to embodiments. In FIG. 1B, a display unit 201 is used to display a captured image, to display a user interface for interactive manipulation, or the like. A console unit 202 has, for example, a keyboard, a mouse, a touch pad or the like, and allows a user to perform various instructions or settings with respect to the information processing apparatus 200. By executing an OS or an application program and controlling each functional block, a CPU 203 realizes the pixel correction processing according to the above described embodiment.

A primary storage apparatus 204 is, for example, a volatile storage apparatus such as a RAM, and is used as a temporary data storage region, such as a work area of the CPU 203. A secondary storage apparatus 205 is for example a nonvolatile storage apparatus such as a hard disk drive, an SSD, or an EEPROM, and stores an OS, firmware, application programs, various setting information, or the like.

A communication apparatus 206 allows the information processing apparatus 200 to transmit/receive a control command or data with an external apparatus. Note that the communication apparatus 206 may perform communication with an external device by a wired connection, for example a USB (Universal Serial Bus) cable or the like, or may perform communication with an external device by a wireless connection such as that of a wireless LAN. In addition, the external apparatus may be directly connected to, may be connected to via a server, or via a network such as the Internet.

In addition, the communication apparatus 206 may be equipped with a function that accesses a detachably mountable storage medium such as the storage medium 106 of the image capture apparatus 100. By attaching a storage medium removed from an image capture apparatus to the communication apparatus 206, it is possible to read image data from the storage medium into the information processing apparatus 200.

Other Embodiments

In the above described embodiments, if it is not determined that a value of a correction target pixel is influenced by flare, processing that corrects the influence of crosstalk is applied to the correction target pixel. However, because an effect of the present invention can be achieved if it is possible to set an appropriate threshold for a pixel value that is influenced by flare, it is not essential to apply the processing to correct the influence of crosstalk to a correction target pixel determined to not receive the influence of flare.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-265779, filed on Dec. 26, 2014, which is hereby incorporated by reference herein in its entirety.

What is claimed is:

1. An image processing apparatus that suppresses image degradation caused by a flare due to reflected light, comprising:
 a processor that executes a program stored in a memory and functions as:
  an image capturing unit configured to capture an image;
  an obtaining unit configured to obtain, from the captured image, a value of a first imaging pixel adjacent in a first direction to a first focusing pixel, and a value of a second imaging pixel adjacent in the first direction to a second focusing pixel present in a vicinity of the first imaging pixel; and
 a correcting unit configured to correct the value of the first imaging pixel based on a result of comparing (a) the values of the first imaging pixel and the second imaging pixel with (b) values based on values of a plurality of third imaging pixels that exist in vicinities of the first imaging pixel and the second imaging pixel and are not adjacent to a focusing pixel, in order to suppress an effect on the value of the first imaging pixel that is caused by the flare.

2. The image processing apparatus according to claim 1, wherein
 the correcting unit corrects the value of the first imaging pixel if differences of the values of the first imaging pixel and the second imaging pixel with the values based on the values of the plurality of third imaging pixels exceed a first threshold.

3. The image processing apparatus according to claim 1, wherein
 the correcting is processing that replaces the value of the first imaging pixel with one of the values based on the values of the plurality of third imaging pixels.

4. The image processing apparatus according to claim 1, wherein color filters of the same color are provided for the first imaging pixel, the second imaging pixel, and the third imaging pixels.

5. The image processing apparatus according to claim 1, wherein
color filters having spectral characteristics different to that of the color filters provided for the first imaging pixel, the second imaging pixel, and the third imaging pixels, are provided for the first focusing pixel and the second focusing pixel.

6. The image processing apparatus according to claim 1, wherein
the first direction is a direction in which a flare occurs which is expected based on a position of a high luminance object.

7. The image processing apparatus according to claim 2, wherein
the correcting unit,
if the differences do not exceed the first threshold,
corrects the value of the first imaging pixel if the differences exceed a second threshold smaller than the first threshold.

8. The image processing apparatus according to claim 1, wherein the image processing apparatus is an image capture apparatus.

9. An image processing method that suppresses image degradation caused by a flare due to reflected light, comprising:

capturing an image;

obtaining, from the captured image, a value of a first imaging pixel adjacent to a first focusing pixel in a first direction;

obtaining, from the captured image, a value of a second imaging pixel adjacent in the first direction to a second focusing pixel present in a vicinity of the first imaging pixel;

comparing (a) values of the first imaging pixel and the second imaging pixel with (b) values based on values of a plurality of third imaging pixels that exist in vicinities of the first imaging pixel and the second imaging pixel and are not adjacent to a focusing pixel; and correcting the value of the first imaging pixel based on a result of the comparing, in order to suppress an effect on the value of the first imaging pixel that is caused by the flare.

* * * * *